United States Patent [19]

Tsurumaru et al.

[11] Patent Number: 4,814,018

[45] Date of Patent: Mar. 21, 1989

[54] FILLER FOR NOISE INSULATING MATERIAL AND NOISE INSULATING MATERIAL USING SAME

[75] Inventors: Hidekazu Tsurumaru, Osaka; Nobuhiro Fujio, Akashi; Takeshi Yamasaki, Higashiosaka; Toshio Nishizaki, Urawa; Isao Negisi, Kawaguchi, all of Japan

[73] Assignees: Tatsuta Electric Wire and Cable Co., Ltd., Higashiosaka; Nippon Mining Co., Ltd., Tokyo, both of Japan

[21] Appl. No.: 64,463

[22] Filed: Jun. 22, 1987

[30] Foreign Application Priority Data

| Jun. 23, 1986 | [JP] | Japan | 61-147874 |
| Jun. 23, 1986 | [JP] | Japan | 61-147875 |
| Jun. 23, 1986 | [JP] | Japan | 61-147876 |
| Jun. 23, 1986 | [JP] | Japan | 61-147877 |
| Jun. 23, 1986 | [JP] | Japan | 61-147878 |

[51] Int. Cl.$^4$ .................. C09C 1/22; E04B 1/74
[52] U.S. Cl. .................. 106/457; 106/459; 106/481; 252/62; 524/431; 524/409; 524/411; 524/412; 524/80
[58] Field of Search ........... 252/62; 524/431, 409, 524/80, 411, 412; 106/288 B, 304, 457, 459, 481

[56] References Cited

U.S. PATENT DOCUMENTS

| 4,242,240 | 12/1980 | Cerny et al. | 524/431 |
| 4,359,343 | 11/1982 | Silberberg | 106/308 Q |
| 4,490,498 | 12/1984 | Yokota et al. | 524/431 |

OTHER PUBLICATIONS

Derwent Abstracts, Abstract No. 82-27029E/14, "Soft Vinyl Chloride Resin Sound Proofing Material", Japanese Patent J57034064, 2/24/82.

Derwent Abstracts, Abstract No. 85-200813/33, "Flame-Retarding Sound Proofing Soft Material", Japanese Patent J60127254, 7/6/85.

Derwent Abstracts, Abstract No. 82-29915E/15, "Flame-Retarding Polyvinyl Chloride Resin Compsn.", Japanese Patent J57040542 8/25/80.

*Primary Examiner*—Paul Lieberman
*Assistant Examiner*—Christine A. Skane
*Attorney, Agent, or Firm*—Oblon, Fisher, Spivak, McClelland & Maier

[57] ABSTRACT

Fillers comprising a composition in which 50-90 wt. % or iron oxides and 10-30 wt. % of silica are contained, at least 50 wt. % of the iron oxides being present in the form of iron oxide silicate, and the content of alkali metal oxides or alkaline earth metal oxides is 10 wt. % or less in total, are suitable as fillers for the fabrication of noise insulating materials. Noise insulating materials obtained by using said fillers are excellent in flexibility and processibility and moreover are large in surface density, thus exhibiting excellent noise insulating ability.

16 Claims, No Drawings

FILLER FOR NOISE INSULATING MATERIAL AND NOISE INSULATING MATERIAL USING SAME

BACKGROUND OF THE INVENTION (a) Field of the Invention

This invention relates to fillers having chemical compositions suitable for those for the fabrication of noise insulating materials and to noise insulating materials formed by blending said fillers with synthetic resin binders by making use of the characteristics of the fillers.

(b) Description of the Prior Art

There have been known to date a variety of noise insulating materials for the prevention of external noise from entering and of sound from emitting outside or sound absorbing materials for weakening the reflection of sound.

These noise insulating materials are processed into sheets and applied or allowed to adhere on the floors or walls of automobiles, rail road cars and buildings or are widely used for the fabrication of composite materials by sticking them together with steel plates, nonwoven fabrics, concrete panels or wood plates. In order to enhance noise insulating effects of these composite materials, it is desirable to fill a filler of high density in as large an amount as possible in a unit weight of a resin.

A noise insulating material with high noise insulating effects requires blending of a greater proportion of a filler having a large specific weight with a binding material of superb processability, according to the following mass law of sound insulation:

$$TL = a \times \log mf + b$$

wherein TL is a transmission loss (dB), m is a surface density (kg/m$^2$), f is a frequency (Hz) and "a" and "b" are individually a constant.

However, fillers, when used for the fabrication of noise insulating materials, can not be filled in binders in large amounts and also can not impart flexibility to the noise insulating materials, if they fail to obtain proper combination with binders. In addition, such problems are raised that upon molding and processing the blended materials what is called a plate-out phenomenon occurs seriously and the surface finish of the products is thereby degraded.

In this connection, a sound proof material has recently been proposed, in which a vinyl chloride resin containing a plasticizer is combined and blended with iron oxides by produced in the steel making process (Japanese Patent Laid-Open No. 34064/1982). In this disclosure, it is emphasized that the iron oxides are excellent in adhesive property with vinyl chloride resins. The oxide-base filler has the following composition and hence contains a lot of CaO.

| | |
|---|---|
| CaO | 50 wt. % |
| SiO$_2$ | 14 wt. % |
| FeO & Fe$_2$O$_3$ | 23 wt. % |
| MgO | 7 wt. % |
| MnO | 5 wt. % |

However, the sound proof material is poorly released from the surface of roll upon its fabrication and also takes prolonged period of time for gelation so that the mechanical properties of the resulting sheets are not deemed satisfactory.

Currently known noise insulating materials employ, as a binder, natural rubber, synthetic rubber, rubber adhesives, polyethylene, polypropylene, polyvinyl chloride, synthetic resin adhesives and asphalt and, as a filler, lead powder, lead compounds, iron powder, iron oxide slag and barytes (barium sulfate), all of which have large specific gravities.

Lead powder and lead compounds are favorable in view of their large specific gravities, but they are expensive and, upon combustion, are liable to evolve toxic dust gases which contain lead oxides. Iron powder is disadvantageous in that it produces rush and thus deteriorates the appearance of the product significantly. Iron oxide slag is inexpensive, but it contains calcium oxide in considerable amounts so that its specific gravity is low as compared with those of the foregoings. Further, iron oxide slag involves problems in that when kneaded into a thermoplastic resin, it adheres to the surface of roll seriously and thus is deficient in processibility.

There have been known to date many noise insulating materials which are fabricated by mixing inorganic powder in a resin and then molding the resultant resin composition. For example, Japanese Patent Publication No. 25375/1983 discloses a resin composition obtained by mixing powder of iron or an iron compound in a mixture of a vinyl chloride resin and a methacrylic resin. Japanese Patent Laid-Open No. 62361/1977 discloses to incorporate a filler, the specific gravity of which is 4 or higher, in the abovedescribed combination of the resins and teaches that the resultant composition has excellent mechanical strength and moldability.

In addition, Japanese Patent Publication No. 21052/1980 discloses a noise insulating material, which makes combined use of an ethylene-vinyl acetate copolymer, especially, an ethylene-vinyl acetate copolymer containing 10–28 wt. % of vinyl acetate and an ethylene-propylene base synthetic rubber, and also teaches its good moldability.

As noise insulating materials imparted with flame retardancy in addition to noise insulating property and flexibility. reference may be had to Japanese Patent Publication No. 32951/1982 and Japanese Patent Laid-Open Nos. 127254/1985 and 127341/1985 which disclose noise insulating materials composed of a PVC-base resin in combination with Sb$_2$O$_3$, tricresyl phosphate and chlorinated paraffin respectively.

Recently, we have also proposed a filler composed of iron oxide and silicon oxide as essential components and also containing basic components such as CaO and MgO in amounts limited below their respective prescribed levels, as well as a noise insulating material obtained by kneading the filler with a vinyl chloride resin and molding the resultant resin composition (Japanese Patent Laid-Open Nos. 56732/1986 and 33887/1987). The present invention relates to an improvement to the above filler and features chemical bonding between iron oxide and silicon oxide.

Further, for noise insulating materials to be used as building materials for interior finish of buildings and hotels, it is important to have sufficient fire protective abilities, or in other words, to be fire retardant and hard to evolve toxic gases and black smoke when a fire takes place.

SUMMARY OF THE INVENTION

A principal object of the present invention is to provide a filler which is intimately blended with a specified synthetic resin used as a binder, is well-processible, has a high specific gravity, and thus is suitable for the fabrication of noise insulating materials excellent in flexibility and mechanical strength. A further principal object of the present invention is to provide a noise insulating material superb particularly in flexibility and fire retarding ability which comprises said filler and a binder blended therewith, the latter being composed of a specified synthetic resin suitable for binding the former.

Other objects of the present invention will be obvious from the description set forth below.

DETAILED DESCRIPTION OF THE INVENTION

The filler for use in fabricating noise insulating materials in the practice of the present invention is characterized by containing the following chemical composition. The filler in accordance with the present invention comprises a chemical composition in which 50-90 wt. % of iron oxides and 10-30 wt. % of silica are contained as principal constituents, all or a greater part of the iron oxides and the silica being present in the form of iron oxide silicate ($2FeO.SiO_2$: iron (II) ortho-silicate), and the content of alkali metal oxides or alkaline earth metal oxides should be 10 wt. % or less in total. No particular limitations are imposed on the composition of the remaining portion.

The iron oxides in the above-described composition may include various forms of iron oxide such as $FeO$, $Fe_2O_3$, $Fe_3O_4$, and $FeO.Fe_2O_3$, $nFEO.SiO_2$ and $nFeO.Fe_2O_3.SiO_2$ (n is an integer of 1-3). Of these forms of iron oxide, that in the form of iron oxide silicate is excellent particularly in adhesive property with resins used as a binder. Further, iron oxides present in the form of $nFeO.SiO_2$ and $nFe_2O_3.SiO_2$ and are favorable in uniform dispersibility of the granules into the above-described resins as compared with those in which iron oxide granules and $SiO_2$ granules are simply mixed by mechanical means, and thus are especially adequate as the filler.

Therefore, for the fillers in the practice of the present invention, it is important that a greater part of the constituents, i.e., iron oxides and silica, are present in the form of iron oxide silicate. It is hence favorable that 50 wt. % or more, preferably 70 wt. % or more, or more preferably 80 wt. % or more of the iron oxides are present in the form of $nFeO.SiO_2$ and $nFeO.Fe_2O_3.SiO_2$ in which n represents an integer of 1-3.

If the content of the iron oxides in the whole filler is 50 wt. % or less, the noise insulating material obtained by using said filler fails to exhibit sufficient noise insulating effects. Since the silica itself in the filler has a low bulk density of about 0.3-1, it does not serve to improve the surface density of a noise insulating material in which the filler is used. However, the presence of silica can increase the amount of iron oxides to be filled markedly and shows an effect of improving the surface smoothness of the noise insulating materials. Accordingly, in order to increase the amount of iron oxides filled is a noise insulating material, it is essential to allow silica to be present in the filler in an amount of at least 10 wt. %. However, as described above, since silica itself is low in density, its presence in the filler in large amounts unfavorably results in the suppress of the amount of the filler to be filled at high densities. The amount of silica in the filler should therefore be at most 30 wt. %.

Further, it is preferable for the filler of the present invention to contain alkali metal oxides or alkaline earth metal oxides such as $Na_2O$, $MgO$ and $CaO$ in a smaller amount. It is therefore necessary to restrict their total amounts to 10 wt. % or less, preferably to 7 wt. % or less, or particularly to 5 wt. % or less. Incidentally, in the case of a noise insulating material employing a filler in which these oxides are present, they are responsible for the plateout phenomenon occurred on the metal surface of roll upon its fabrication and also for the delay of gelation. These phenomena become serious as the amounts of the oxides are increased.

As those satisfying the above-described specific chemical composition of the filler may be mentioned what is called iron concentrate slag which is obtained by: adding silicon dioxide and oxygen to a matte obtained from a autogenous-blast furnace in a copper refining process for its silicification and oxidation in a converter to form a slag; subjecting the slag to electromagnetic separation; subjecting the resulting slag to ore floatation to separate copper concentrates from iron concentrate slag; and subjecting the latter to dehydration.

Specifically, the slag contains about 50-80 wt. % of $2FeO.SiO_2$ (40-50 wt. % as FeO and 15-30 wt. % as $SiO_2$), 10-30 wt. % of $Fe_3O_4$, 5 wt. % of $Fe_2O_3$ and 5 wt. % or less of MnO as principal components, but contains practically no CaO. Further, the slag is composed of crushed particles which have undergone ore floatation and have particle sizes of about 30μ. It has a bulk density of 3-4 and a true specific gravity of 4.5-5.5 so that it is suitable for use as a filler in the practice of the present invention.

In order to use the iron concentrate slag as the filler of the present invention, it should be borne in mind that the slag be dried to reduce its water content to 2 wt. % or less, preferably to 1 wt. % or less, or particularly to 0.5 wt. % or less. It is because the slag containing a larger amount of water is responsible for the foaming occurring in the course of fabricating a composite material when it is used as a filler of the material.

The noise insulating material obtained by utilizing the characteristics of the filler according to the present invention will be described hereunder. The noise insulating material according to the present invention is obtained by kneading the filler with a specified synthetic resin as a binder and forming and processing the resulting mixture. The filler to be used for this purpose is composed of granules with sizes of 200-mesh through or preferably 250-mesh through and is mixed with a binder in a blending proportion of 400-2,000, preferably 400-1,500 parts by weight of the filler to 100 parts by weight of the binder. The mixture is heated to a temperature of about 100°-150° C. and then kneaded intimately by means of a Banbury mixer, mixing roll or similar mixers.

The binder used for fabricating noise insulating materials by using the fillers of the invention may be ethylene-vinyl acetate resins or a combination of vinyl chloride resins and ethylene-vinyl acetate resins.

Exemplary blending proportions of the filler and the binder in the noise insulation material according to the present invention are illustrated below. In the present invention, however, an organic flame retardant containing red phosphorus, antimony oxide or a halogen may be blended to the mixture of filler and binder for the purpose of improving the flexibility, fire retardancy and low-smoke property of the resulting noise insulating material. A blending example in a noise insulating material is as follows:

To 100 parts by weight of a vinyl chloride resin as a binder are blended 30-15 parts by weight of a plasticizer, 30-150 parts by weight of either one or both of an ethylene-vinyl acetate copolymer and an ethylene vinyl acetate-vinyl chloride ternary copolymer, and 400-2,000 parts by weight of a filler.

The vinyl chloride resin used herein may include vinyl chloride homopolymers and copolymers of vinyl chloride such as ethylene-vinyl chloride copolymers, vinyl acetate-vinyl chloride copolymers and urethane-vinyl chloride copolymers.

No particular limitation is vested on the plasticizer used herein. Any plasticizer which can be blended with the vinyl chloride resin may be used.

The amount of the plasticizer to be blended is in the range of 30-150 parts by weight or preferably 50-100 parts by weight per 100 parts by weight of the vinyl chloride resin. If the amount of the plasticizer to be blended is less than 30 parts by weight, the resulting noise insulating material will be deficient in flexibility and have poor processibility.

On the contrary, if the amount of the plasticizer to be blended exceeds 150 parts by weight, the resulting noise insulating material will unfavorably have lowered mechanical strength and its processibility will also be deteriorated.

The ethylene-vinyl acetate copolymers useful in the practice of the present invention are those containing vinyl acetate in the range of 15-70 wt. % or preferably 30-60 wt. %, more preferahly 35-60 wt. %.

The ethylene-vinyl acetate-vinyl chloride ternary copolymers useful in the practice of the present invention are those containing ethylene-vinyl acetate in the range of 30-60 wt. %.

The amount to be blended of either one or both of the ethylene-vinyl acetate copolymer and the ethylene-vinyl acetate-vinyl chloride ternary copolyme is in the range of 30-150 parts by weight or preferably 50-100 parts by weight based on 100 parts by weight of the vinyl chloride resin. Any amounts less than 30 parts by weight will cause the resulting noise insulating material to be deficient in flexibility, while any amounts in excess of 150 parts by weight will degrade the mechanical strength of the resulting noise insulating material. Thus, any amounts outside the above range are not preferred.

The noise insulating material comprising a composition of the above-described blending proportions has a large specific gravity and also retains flexibility and mechanical strength. Especially, the joint use with an ethylene-vinyl acetate or ethylene-vinyl acetate-vinyl chloride copolymer, as compared with the case in which a vinyl chloride resin is used singly, will permit the possible amount of the filler to be filled to increase to 1,800 parts by weight and moreover, enable the resulting noise insulating material to retain flexibility.

The noise insulating material comprising the aforesaid composition may be used in the applications for common purpose without any trouble or inconvenience. For the applications demanding fire retarding ability, in particular, it is preferable to blend antimony trioxide to the above-described composition in an amount of 5-30 parts by weight per 100 parts by weight of the vinyl chloride resin.

The antimony trioxide useful in the practice of the present invention may be of a water-insoluble white powder with particle sizes of about 10-100$\mu$ prepared by any known processes. The amount of the antimony trioxide to be blended is in the range of 5-30 parts by weight or preferably 10-20 parts by weight per 100 parts by weight of the vinyl chloride resin. If the amount of the antimony trioxide to be blended is less than 5 parts by weight, the resulting noise insulating material will be insufficient in fire retarding ability. Conversely, any amounts greater than 30 parts hy weight will not improve the fire retarding ability any further due to saturation, and thus are not economical from the viewpoint of cost.

In other blending examples of the noise insulating material according to the present invention are included noise insulating materials imparted with smoke-preventive ability and having the following blending proportions. In one of them, 400-1,500 parts by weight of a filler is blended with 100 parts by weight of an ethylene vinyl acetate copolymer as a binder.

Further, to impart fire retardant property as well as smoke-preventive ability to a noise insulating material, the following blending proportion should be chosen. Namely, 400-1,500 parts by weight of a filler and 5-50 parts by weight of a red phosphorus powder are blended to 100 parts by weight of an ethylene-vinyl acetate copolymer. Alternatively, 400-1,500 parts by weight of a filler, 20-100 parts by weight of an organic flame retardant containing a halogen and 5-50 parts by weight of antimony trioxide are blended to 100 parts by weight of an ethylene-vinyl acetate copolymer.

The ethylene-vinyl acetate copolymer used as a binder in each of the above blending examples has superb affinity for the aforesaid filler of the present invention. Consequently, it is possible to fill the filler in the copolymer upto 1,500 parts by weight per 100 parts by weight of the copolymer. This also makes it possible to increase the specific gravity of the resulting insulating material to 3.4 kg/m$^2$ per millimeter of its thickness while permitting the material to retain its flexibility and mechanical strength. Further, use of the aforesaid resin causes no evolution of toxic gases upon a fire and also permits a significant reduction in the emission of black smoke.

The ethylene vinyl acetate copolymer used herein contains vinyl acetate in an amount in the range of 15-70 wt. % or preferably 30-60 wt. %, more preferably 35-60 wt. %. If the vinyl acetate centent is below 15 wt. %, it becomes impossible to fill the filler of the present invention to a high degree so that the resulting noise insulating material is lowered in specific gravity and becomes deficient in noise insulating ability. On the other hand, any contents greater than 70 wt. % will unfavorably degrade the mechanical strength of the resulting noise insulating material.

The amount of the filler to be blended is in the range of 400-1,500 parts by weight or preferably 600-1,200 parts by weight based on 100 parts by weight of the ethylene-vinyl acetate copolymer. If the amount of the filler to be blended is less than 400 parts by weight, the resulting noise insulating material will not have increased specific gravity and will be deficient in noise insulating ability. On the contrary, any amounts greater than 1,500 parts by weight will unfavorably lead to poor processibility in kneading and cause the resulting noise insulating material to lack flexibility and reduce its mechanical strength.

The amount to be blended of the red phosphorus powder, which is used to impart fire retarding property to the noise insulating material, is in the range of 5–50 parts by weight or preferably 10–30 parts by weight relative to 100 parts by weight of the ethylene-vinyl acetate copolymer. If the amount of the red phosphorus powder to be blended is below 5 parts by weight, the resultant noise insulating material will not have sufficient fire retarding property. Conversely, any amounts in excess of 50 parts by weight will not improve the fire retarding property any further due to saturation and renders the noise insulating material uneconomical in view of its cost. Further, the processibility and mechanical strength of the material will unfavorably be degraded.

The halogen-containing organic flame retardant useful in the practice of the present invention includes chlorinated paraffin, decabromodiphenyl ether and tetrabromobisphenol A. They may be used singly or in combination.

The amount of the halogen-containing flame retardant to be blended is in the range of 20–100 parts by weight or preferably 30–60 parts by weight based on 100 parts by weight of the ethylene-vinyl acetate copolymer. If its amount to be blended is less than 20 parts by weight, the resulting noise insulating material will not be imparted with sufficient fire resistative ability. On the other hand, when the amount exceeds 100 parts by weight, the resulting noise insulating material will not be improved any further in fire retarding property due to saturation and is uneconomical from the stand point of cost. Further, it will unfavorably be lowered in mechanical strength and processability.

No particular limitations are imposed on the antimony trioxide used in the present invention, so far as it is of a water-insoluble white powder and prepared in accordance with the processes known in the art. The product will not be affected by the granular state of the trioxide nor by its shape.

The amount of the antimony trioxide to be blended is in the range of 5–50 parts by weight or preferably 10–30 parts by weight per 100 parts by weight of the ethylene-vinyl acetate resin. If the amount of the antimony trioxide to be blended is less than 5 parts by weight, the resulting noise insulating material will be insufficient in fire retarding property. On the contrary, any amounts in excess of 50 parts by weight will not improve its fire retarding property any further due to saturation and render the resulting noise insulating material uneconomical in view of cost.

As described above, the filler according to the present invention is superior in affinity for the resin used as a binder. Even if it is filled in a given amount of a resin at its high blending proportion, one can obtain a noise insulating material provided with excellent flexibility and mechanical strength. Further, the noise insulating material with the above-described filler contained has such a high specific gravity that its weight per 1 mm of thickness times 1 m² of area amounts to 3.4 kg and moreover is excellent in fire retarding property.

The present invention will be illustrated more specifically with reference to the following examples. It should however be understood that the scope of the present invetion is not limited by these examples.

EXAMPLE 1 AND COMPARATIVE EXAMPLE 1

To 165 parts by weight of a compound consisting of 100 parts by weight of a vinyl chloride resin (average polymerization degree: 800), 60 parts by weight of DOP as a plasticizer and 5 parts by weight of a tin-containing stabilizer was mixed and kneaded 600 parts by weight of each of the fillers (particle size: about 30μ) having the compositions given in Table 1. Each of the resulting kneaded products was formed into a sheet with a thickness of 1.0 mm by means of a two-roll of 8 inches×20 inches. Each of the resulting sheets was examined and evaluated with respect to the processibility. The results are as shown in Table 2. As Comparative Example 1, fillers different from the fillers of the present invention were formed into sheets in the same manner as described above and their processibilities were evaluated and are given in the same table.

TABLE 1

(Composition of Filler)
(unit: wt. %)

| | | Example No. | | | | |
| --- | --- | --- | --- | --- | --- | --- |
| | This Invention (Example 1) | | | Comparative Example 1 | | |
| Composition | F-1 | F-5 | F-6 | F-2 | F-3 | F-4 |
| Iron oxides | 70 | 64 | 58 | 24 | 52 | 70 |
| Items — FeO | 45* | 40* | 38* | 10 | 31* | — |
| — $Fe_2O_3$ | 0 | 0 | 0 | 14 | 6 | 70 |
| — $Fe_3O_4$ | 25 | — | 21 | 0 | 15 | — |
| $SiO_2$ | 20* | 28* | 17* | 12 | 17* | 25 |
| $Al_2O_3$ | 1.5 | 1 | 1 | 1 | 1 | — |
| CaO | 0 | 0 | 0 | 37 | 15 | 2 |
| MgO | 1 | 1 | 0 | 8 | 4 | 3 |
| Lead granules | 0 | 0 | 20 | 0 | 5 | 0 |
| Water | 0.5 or below | 0.5 | 0.5 or below | 0.5 or below | 0.5 or below | 0 |

Note:
Each of the Sample Nos. represents the followings:
F-1 is a filler obtained by oxidizing and sillicificating in a converter a matte from a copper refinery self-blast furnace, crushing the converter slag and subjecting the slag to ore floatation;
F-2 is a slag from a converter in a steel making process;
F-3 is a mixture of F-1 and F-2 (F-1:F-2 = 3:2);
F-6 is a filler obtained by adding lead granules to F-1: of these, those marked with * are present in the form of $2FeO.SiO_2$;
F-5 is a mixture of F-1 and a $SiO_2$ powder; and
F-4 is a mixture of a $Fe_2O_3$ powder and a $SiO_2$ powder.

TABLE 2

| Processability | This Invention (Example 1) | | | Comparative Example 1 | | |
|---|---|---|---|---|---|---|
| | Sample No. | | | | | |
| | F-1 | F-5 | F-6 | F-2 | F-3 | F-4 |
| Plate-out phenomenon | no | no | no | serious | serious | a little |
| Gelation time (second) | 45 | 45 | 47 | 85 | 78 | 85 |
| Sheet surface density (kg/m$^2$) | 2.65 | 2.15 | 2.9 | 1.6 | 2.0 | 2.25 |
| Tensile strength, MD (kgf) | 17.4 | 16.6 | 15.2 | 14.6 | 13.1 | 14.0 |
| Bending resistance | AA | AA | A | B | B | A |

Note:
(1) Marks in Bending resistance signify the followings:
AA: very good
A: good
B: very bad
(2) In Plate-out phenomenon, use of fillers F-2~F-4 causes a large amount of solid matter, which is hard to peel off, to adhere onto the surface of roll and thus ruggedness occurs on the surfaces of the resulting sheets. Further, upon fabrication of the sheets, the fillers are liable to come to the surface of the sheets.
(3) Tensile strength is measured in accordance with JIS L1096, the strip method.

As seen in Table 2, when fillers F-2 and F-3, which contain large amounts of alkaline earth metal oxides such as CaO, are used as in Comparative Example, a plate-out phenomenon takes place seriously and the gelation time is also prolonged nearly two times. Further, the noise insulating materials of the present invention are found to be higher in bending strength and richer in flexibility than those of Comparative Example.

EXAMPLE 2 AND COMPARATIVE EXAMPLE 2

Filler F-1 shown in Table 1 was kneaded independently with the blending materials, the proportions of which are given in Table 3, in a 6-inch ovenroll at 150°–160° C. for 20 minutes to prepare sheets, each having a width of 300 mm and a thickness of about 1 mm. The following properties were examined for each sheet and the results are also given in Table 3.

Specific gravity: represented by kg/mm (thickness)×m$^2$ (area). Since a noise insulating material is largely dependent on the density of the material, the noise insulating property was evaluated by the specific gravity of the material. The larger the specific gravity, the greater is the noise insulating property.

Flexibility: A test piece with a size of 30 mm×70 mm×1 mm was stamped out from each of the sheets prepared. The test piece was bended by 180 degree to examine its flexibility.

O mark: those neither cracked nor broken
Δ mark: those cracked but not broken
X mark: those cracked and broken Processability: While each of the blended compositions in Example and Comparative Example was being kneaded in a 6-inch ovenroll at 150°–160° C. for 20 minutes, its adhering nature round the roll or stickiness thereto was examined and evaluated.

O mark: well-processible
Δ mark: somewhat poorly processible
X mark: poorly-processible

TABLE 3

(parts by weight)

| Blending Material (Phr) | | Example 2 | | | | | Comparative Example 2 | | | | |
|---|---|---|---|---|---|---|---|---|---|---|---|
| | | Sample No. | | | | | | | | | |
| | | 1 | 2 | 3 | 4 | 5 | 7 | 8 | 9 | 10 | 11 |
| Vinyl chloride resin | Note 1 | 100 | 100 | 100 | | | 100 | 100 | 100 | 100 | 100 |
| Ethylene-vinylchloride copolymer | Note 2 | | | | 100 | | | | | | |
| Vinyl acetate-vinyl chloride copolymer | Note 3 | | | | | 100 | | | | | |
| Ethylene-vinyl acetate copolymer | Note 4 | 50 | | 70 | 50 | 50 | 50 | 10 | 50 | | |
| Ethylene-vinyl acetate-vinyl chloride ternary copolymer | Note 5 | 50 | 50 | 70 | | | | | 50 | 160 | |
| Plasticizer (DOP) | | 50 | 100 | 50 | 100 | 100 | 50 | 50 | 20 | 50 | 100 |
| Filler | | 1500 | 1200 | 1900 | 1500 | 1500 | 2100 | 600 | 1000 | 1000 | 1500 |
| Specific gravity | | 2.95 | 2.81 | 3.00 | 2.92 | 2.92 | 3.29 | 2.69 | 2.79 | 2.56 | 2.95 |
| Flexibility | | | | | | | X | Δ | | | X |
| Processability | | | | | | | Δ | Δ | X | Δ | |

Note 1: PVC (SG-1400), product of Ryonichi Co.; average polymerization degree: 1400
Note 2: PVC (E-1300), product of Toyo Soda Ind. Co.; average polymerization degree: 1300
Note 3: PVC (MC-1000), product of Shinetsu Chemical Ind. Co.; average polymerization degree: 1000
Note 4: EVA (Evaflex 45X), product of Mitsui du Pont Chemical Co.; vinyl acetate content: 45 wt. %
Note 5: EVA—VC (Graftmer R-5), product of Nippon Zeon Co., ethylene-vinyl acetate content: 50 wt. %

As is clear from the results shown in Table 3, Sample Nos. 1–6, in which specific blending materials useful in the practice of the present invention are combined properly, have large specific gravities as noise insulating materials and are excellent in such properties as flexibility and processability.

EXAMPLE 3

A sheet was fabricated by adding 15 parts by weight of an antimony trioxide (SbO$_3$) powder to the composition of Sample No. 1 given in Table 3 according to the same procedure as described in Example 2. The fire retarding property of the sheet was examined by the method described below. As a result, it was found that the above-described Sample No. 1 burned whereas that with SbO$_3$ added did not burn.

Fire retarding property: A test piece with a size of 15 mm×70 mm×1 mm was stamped out from the sheet prepared. The test piece was maintained horizontal and a Bunsen burner was ignited in such a way that the tip (top end) of the flame with a length of 15 mm reached the under surface of the test piece. Upon removal of the flame after 15 seconds, it was examined whether or not the test piece burned further.

EXAMPLE 4 AND COMPARATIVE EXAMPLE 3

Filler F-1 shown in the above-described Table 1 and each of the ethylene-vinyl acetate copolymers with the blending proportions given in Table 4 were kneaded with each other in a 6-inch ovenroll at a temperature of 150°–160° C. for 20 minutes, thereby preparing each sheet with a width of 300 mm and a thickness of about 1 mm. The following properties of each of the sheets obtained were examined and the results are also shown in Table 4.

Smoke concentration: The prepared sheet was heat-pressed for 5 minutes at 160° C. and 180 kg/cm² to form a sheet with a thickness of 0.5 mm. Using this sheet, the smoke concentration was determined in accordance with the non-flaming method, a testing method for smoke concentration described in ASTM-E662 (1979).

and processability, but produces smoke at high concentrations.

COMPARATIVE EXAMPLE 4

Noise insulating sheets comprising the compositions of Sample Nos. 20, 21 and 22 given in the above Table 4 added with SbO₃ and decabromodiphenyl ether were fabricated. The fire resistative property of the resulting sheets was measured by the method described in Example 3. The results are shown in Table 5.

TABLE 5

|  |  | Example 5 | | | Comparative Example 4 (parts by weight) | | |
|---|---|---|---|---|---|---|---|
| | | Sample No. | | | | | |
| Blending Material | | 27 | 28 | 29 | 30 | 31 | 32 |
| EVA (Evaflex 45X) | | 100 | | | 100 | 100 | 100 |
| EVA (Evaslene 410P) | Note 2 | | 100 | 100 | | | |
| EVA (Evaflex 560) | Note 3 | | | | | | |
| EVA (Evaslene 310P) | Note 4 | | | | | | |
| Filler | | 1000 | 1000 | 1400 | 1000 | 1000 | 1000 |
| Decabromodiphenyl ether | | 40 | 40 | 30 | 60 | 10 | — |
| Antimony trioxide | | 15 | 20 | 15 | — | 15 | 10 |
| Specific gravity | | 3.13 | 3.19 | 3.37 | 3.11 | 3.13 | 3.16 |
| Flexibility | | | | | | | |
| Processibility | | | | | | | |
| Fire retarding property | | | | | X | X | X |

Note: Mark in the Table means good while mark X signifies poor.

As seen in Table 5, it is obvious that the addition of SbO₃ and decabromodiphenyl ether enables the resulting sheets to improve their fire retarding ability significantly. In other words, taking these results jointly with those of Table 4 into consideration, it can be understood that noise insulating materials which have high specific gravities, possess flexibility and are excellent in smoke-preventive property and fire resistative ability can be fabricated with good processability by using ethylene-vinyl acetate resins as a binder, filling the fillers of the present invention into the resins, and blending specific amounts of SbO₃ and halogen-containing organic flame retardants to the resulting compositions.

TABLE 4

|  |  | Example 4 | | | Comparative Example 3 (parts by weight) | | | |
|---|---|---|---|---|---|---|---|---|
| | | Sample No. | | | | | | |
| Blending Material | | 20 | 21 | 22 | 23 | 24 | 25 | 26 |
| EVA (Evalex 45X) | Note 1 | 100 | | | 100 | | | 40 |
| EVA (Evaslene 410P) | Note 2 | | 100 | 100 | | | | |
| EVA (Evaflex 560) | Note 3 | | | | | 100 | | |
| EVA (Evaslene 310P) | Note 4 | | | | | | 100 | |
| PVC (SG-1400) | Note 5 | | | | | | | 100 |
| Plasticizer (DOP) | | | | | | | | 100 |
| Filler | | 1000 | 1000 | 1400 | 1600 | 500 | 1000 | 1000 |
| Specific gravity | | 3.12 | 3.18 | 3.36 | 3.38 | 2.58 | 3.20 | 2.67 |
| Flexibility | | | | | X | X | | |
| Processibility | | | | Δ | Δ | X | X | |
| Smoke concentration | | 10 | 12 | 8 | 6 | 20 | 10 | 115 |

Note 1: vinyl acetate content, 45 wt. %
Note 2: vinyl acetate content, 60 wt. %
Note 3: vinyl acetate content, 14 wt. %
Note 4: vinyl acetate content, 75 wt. %
Note 5: average polymerization degree, 1400

As can be seen in Table 4, it is obvious that Sample Nos. 20, 21 and 22, which were fabricated by using ethylene-vinyl acetate copolymers with a vinyl acetate content of 45 wt. % or 60 wt. % in accordance with the present invention, are superior in flexibility and processibility in spite of their high specific gravities. On the other hand, Sample No. 26 which was fabricated by using a vinyl chloride resin has considerable flexibility

What is claimed is:

1. A filler for noise insulating material comprising a composition in which 50–90 wt. % of iron oxides and 10–30 wt. % of silica are contained, 50 wt. % or more of the iron oxides being present in the form of iron oxide silicate, and the content of alkali metal oxides or alkaline earth metal oxides is 10 wt. % or less in total.

2. The filler for noise insulating material as claimed in claim 1 wherein 50 wt. % or more of the iron oxides are present in the form of $nFeO \cdot SiO_2$ (n is an integer of 1–3) and/or $nFeO \cdot Fe_2O_3 \cdot SiO_2$ (n is an integer of 1–3).

3. The filler as claimed in claim 1 wherein the content of alkali metal oxides or alkaline earth metal oxides in the filler is 5 wt. % or less in total.

4. The filler as claimed in claim 1 which is composed of an iron concentrate slag obtained by subjecting a slag, which is formed by silicificating and oxidizing a matte obtained in the refining process of copper, to ore floatation.

5. The filler as claimed in claim 4 wherein the water content in the iron concentrate slag is 1 wt. % or less.

6. A flexible noise insulating material formed by blending 30–150 parts by weight of a plasticizer, 30–150 parts by weight of either one or both of an ethylene-vinyl acetate copolymer and an ethylene-vinyl acetate-vinyl chloride ternary copolymer, and 400–2,000 parts by weight of a filler comprising a composition in which 50–90 wt. % of iron oxid,es and 10–30 wt. % of silica are contained, 50 wt. % or more of the iron oxides being present in the form of iron oxide silicate, and the content of alkali metal oxides or alkaline earth metal oxides is 10 wt. % or less in total, to 100 parts by weight of a vinyl chloride resin.

7. The flexible noise insulating material as claimed in claim 6 wherein the vinyl chloride resin is a vinyl chloride resin, ethylene vinyl chloride copolymer, vinyl acetate-vinyl chloride copolymer or urethane-vinyl chloride copolymer.

8. The flexible noise insulating material as claimed in claim 6 wherein the content of vinyl acetate in the ethylene-vinyl acetate copolymer is 15–70 wt. %.

9. The flexible noise insulating material as claimed in claim 8 wherein the content of vinyl acetate in the ethylene vinyl acetate copolymer is 35–60 wt. %.

10. A fire-retardant noise insulating material formed by blending 30–150 parts by weight of a plasticizer, 30–150 parts by weight of either one or both of an ethylene-vinyl acetate copolymer and an ethylene-vinyl acetate-vinyl chloride ternary copolymer, 400–2,000 parts by weight of a filler comprising a composition in which 50–90 wt. % of iron oxides and 10–30 wt. % of silica are contained, 50 wt. % or more of the iron oxides being present in the form of iron oxide silicate, and the content of alkali-metal oxides or alkaline earth metal oxides is 10 wt. % or less in total, and 5–30 parts by weight of antimony trioxide, to 100 parts by weight of a vinyl chloride resin.

11. A low-smoke noise insulating material formed by blending 400–1,500 parts by weight of a filler comprising a composition in which 50–90 wt. % of iron oxides and 10–30 wt. % of silica are contained, 50 wt. % or more of the iron oxides being present in the form of iron oxide silicate, and the content of alkali metal oxides or alkaline earth metal oxides is 10 wt. % or less in total, to 100 parts by weight of an ethylene-vinyl acetate copolymer.

12. A fire-retardant and low-smoke noise insulating material formed by blending 400–1,500 parts by weight of a filler comprising a composition in which 50–90 wt. % of iron oxides and 10–30 wt. % of silica are contained, 50 wt. % or more of the iron oxides being present in the form of iron oxide silicate, and the content of alkali metal oxides or alkaline earth metal oxides is 10 wt. % or less in total, and 5–50 parts by weight of red phosphorus, to 100 parts by weight of an ethylene-vinyl acetate copolymer.

13. A fire-retardant noise insulating material formed by blending 400–1,500 parts by weight of a filler comprising a composition in which 50–90 wt. % or iron oxides and 10–30 wt. % of silica are contained, 50 wt. % or more of the iron oxides being present in the form of iron oxide silicate, and the content of alkali metal oxides or alkaline earth metal oxides is 10 wt. % or less in total, 20–100 parts by weight of a halogen-containing organic flame retardant and 5–50 parts by weight of antimony trioxide, to 100 parts by weight of an ethylene-vinyl acetate copolymer.

14. The noise insulating material as claimed in any one of claims 11 through 13 wherein the ethylene-vinyl acetate copolymer is an ethylene-vinyl acetate copolymer in which 15–70 parts by weight of vinyl acetate is contained.

15. The noise insulating material as claimed in any one of claims 11 through 13 wherein the ethylene-vinyl acetate copolymer is an ethylene-vinyl acetate copolymer in which 35–60 parts by weight of vinyl acetate is contained.

16. The noise insulating material as claimed in claim 13 wherein the halogen-containing organic flame retardant is one or more halogen-containing organic flame retardants selected from the group consisting of chlorinated paraffin, decabromodiphenyl ether and tetrabromobispherol A.

* * * * *